(12) United States Patent
Pfeiffer et al.

(10) Patent No.: US 6,912,775 B1
(45) Date of Patent: Jul. 5, 2005

(54) ASSEMBLY DEVICE FOR ASSEMBLING COMPONENTS

(75) Inventors: Micahel W. Pfeiffer, Richfield, MN (US); Eric D. Johnson, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/129,468

(22) Filed: Aug. 4, 1998

Related U.S. Application Data

(60) Provisional application No. 60/075,888, filed on Feb. 25, 1998.

(51) Int. Cl.[7] .............................................. B23P 19/00
(52) U.S. Cl. ........................ 29/729; 29/603.03; 29/737; 29/783; 29/791; 29/281.5; 360/98.07; 360/98.08; 360/99.08
(58) Field of Search ...................... 29/729, 737, 603.03, 29/783, 791, 281.5, 407.01; 360/98.07, 99.08, 92; 414/751, 223.01; 198/346.2, 468.4; 907/39, 6, 21

(56) References Cited

U.S. PATENT DOCUMENTS

| | | | | |
|---|---|---|---|---|
| 4,481,752 A | * | 11/1984 | Sabel ........................... | 53/448 |
| 4,835,711 A | * | 5/1989 | Hutchins et al. ............ | 364/513 |
| 5,077,888 A | * | 1/1992 | Tokisue et al. ............... | 29/467 |
| 5,226,778 A | * | 7/1993 | Sekitani ....................... | 414/744 |
| 5,451,130 A | * | 9/1995 | Kempf .......................... | 414/27 |
| 5,507,085 A | * | 4/1996 | Easton et al. ............. | 29/407.04 |
| 5,541,897 A | * | 7/1996 | Baca et al. .................... | 369/37 |
| 5,606,153 A | * | 2/1997 | Fix, Sr. et al. ................ | 177/45 |
| 5,740,602 A | * | 4/1998 | Peterson et al. .............. | 29/748 |
| 5,987,735 A | * | 11/1999 | Horning et al. ................ | 29/737 |
| 6,041,488 A | * | 3/2000 | Wang ....................... | 29/603.03 |
| 6,049,969 A | * | 4/2000 | Jerkins et al. ................ | 29/737 |
| 6,094,804 A | * | 8/2000 | Chuang et al. .......... | 29/603.03 |
| 6,105,240 A | * | 8/2000 | Chuang et al. ............... | 29/729 |
| 6,427,318 B1 | * | 8/2002 | Pfeiffer et al. ........... | 29/603.03 |
| 2001/0005815 A1 | * | 6/2001 | Rosenberg et al. ........... | 702/95 |
| 2001/0009534 A1 | * | 7/2001 | Sato ............................ | 369/34 |

OTHER PUBLICATIONS

Title: "Disk drive components assembly apparatus" has assembly arm, Derwent information LTD, 1999, Abstract and a Drawing only.*

* cited by examiner

*Primary Examiner*—Minh Trinh
(74) *Attorney, Agent, or Firm*—Westman, Champlin & Kelly, P.A.

(57) ABSTRACT

An apparatus for assembling components of a data storage system. Assembly components are housed by a component storage member removably coupled to the frame of the apparatus for supporting a plurality of component stacks for automated assembly. The apparatus includes an assembly coupled to the component storage member for sequentially unloading components and assembling the unloaded components in a data storage system. The apparatus is adapted for high capacity, production and speed assembly.

23 Claims, 15 Drawing Sheets

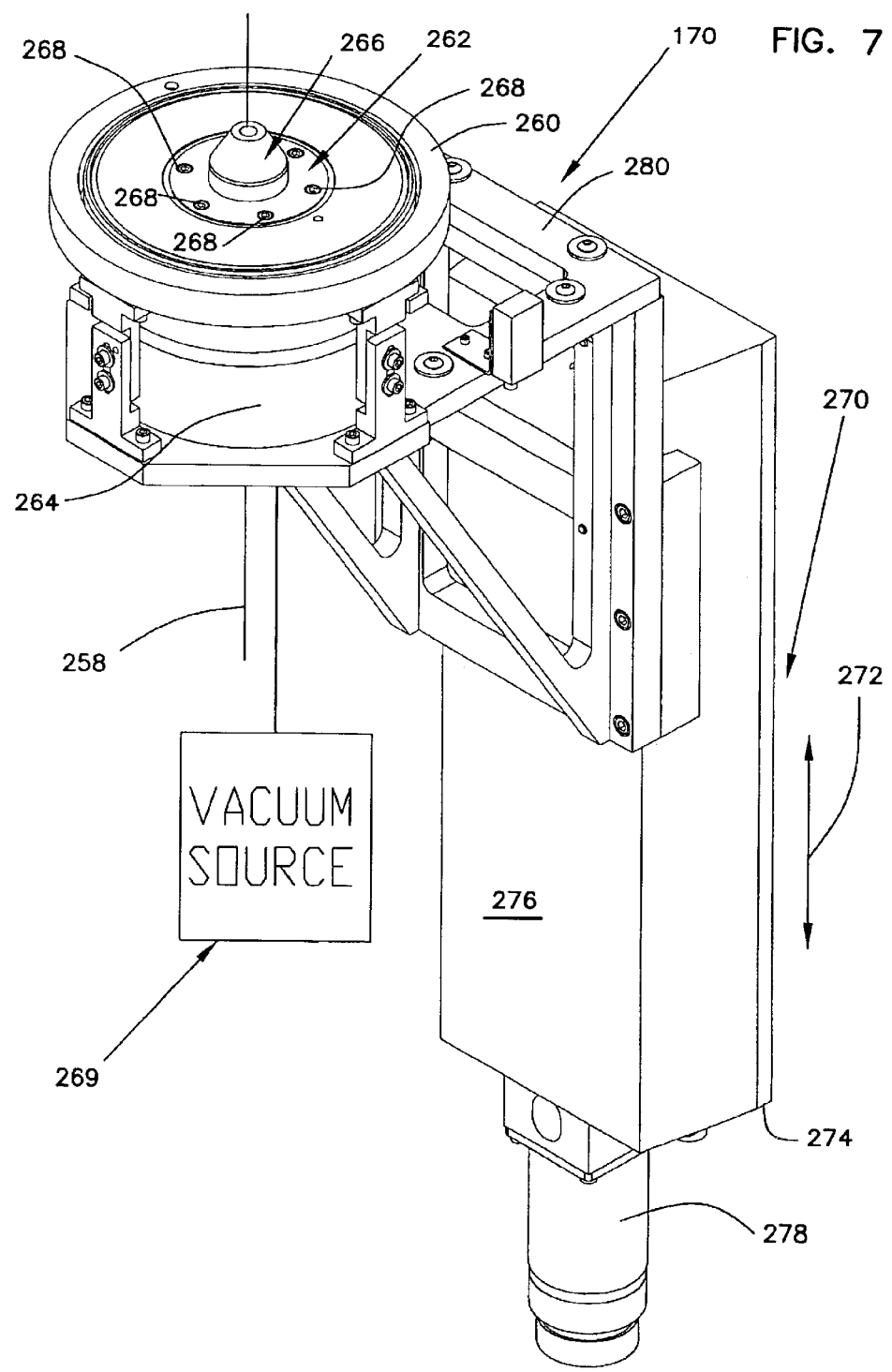

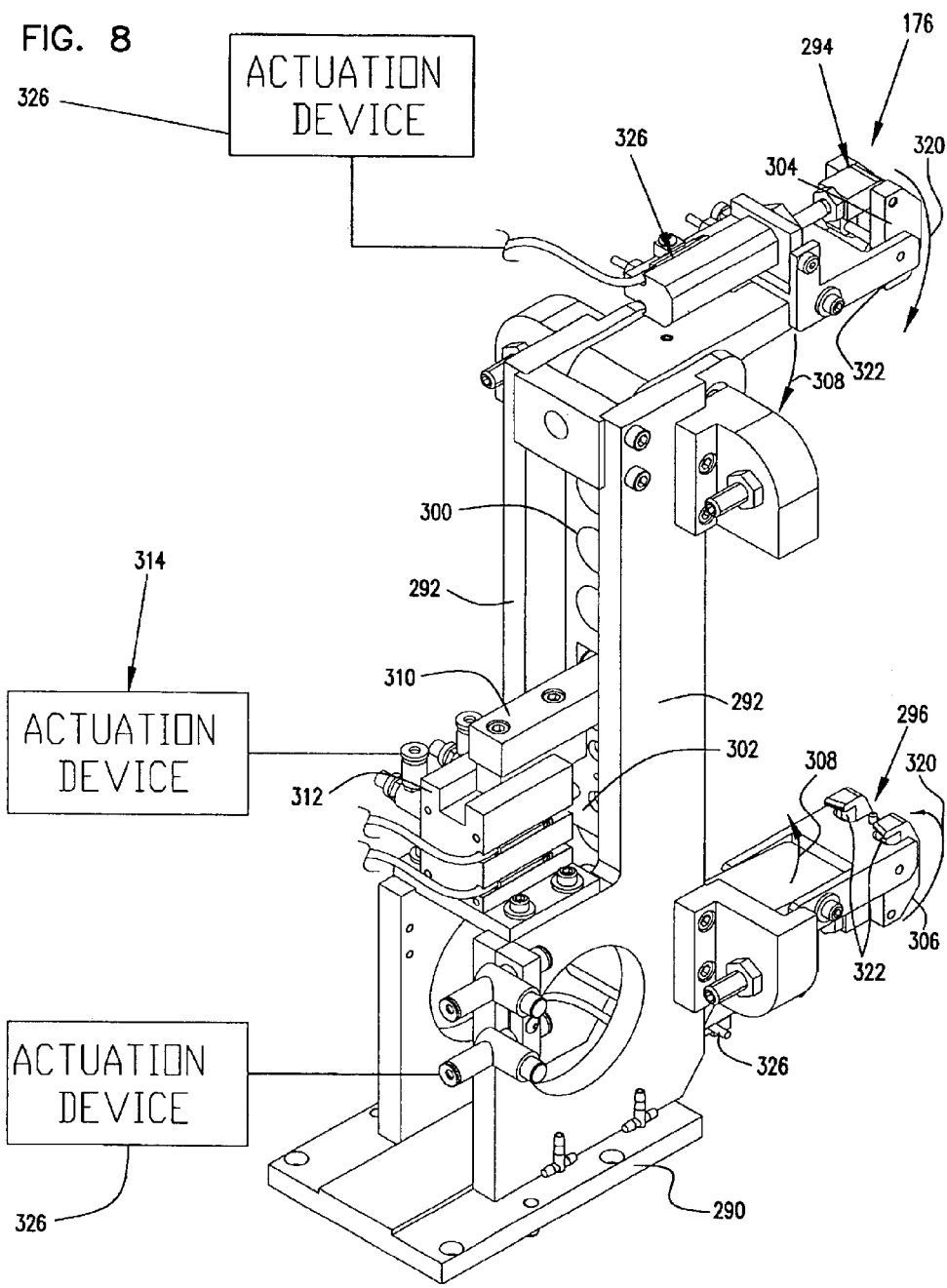

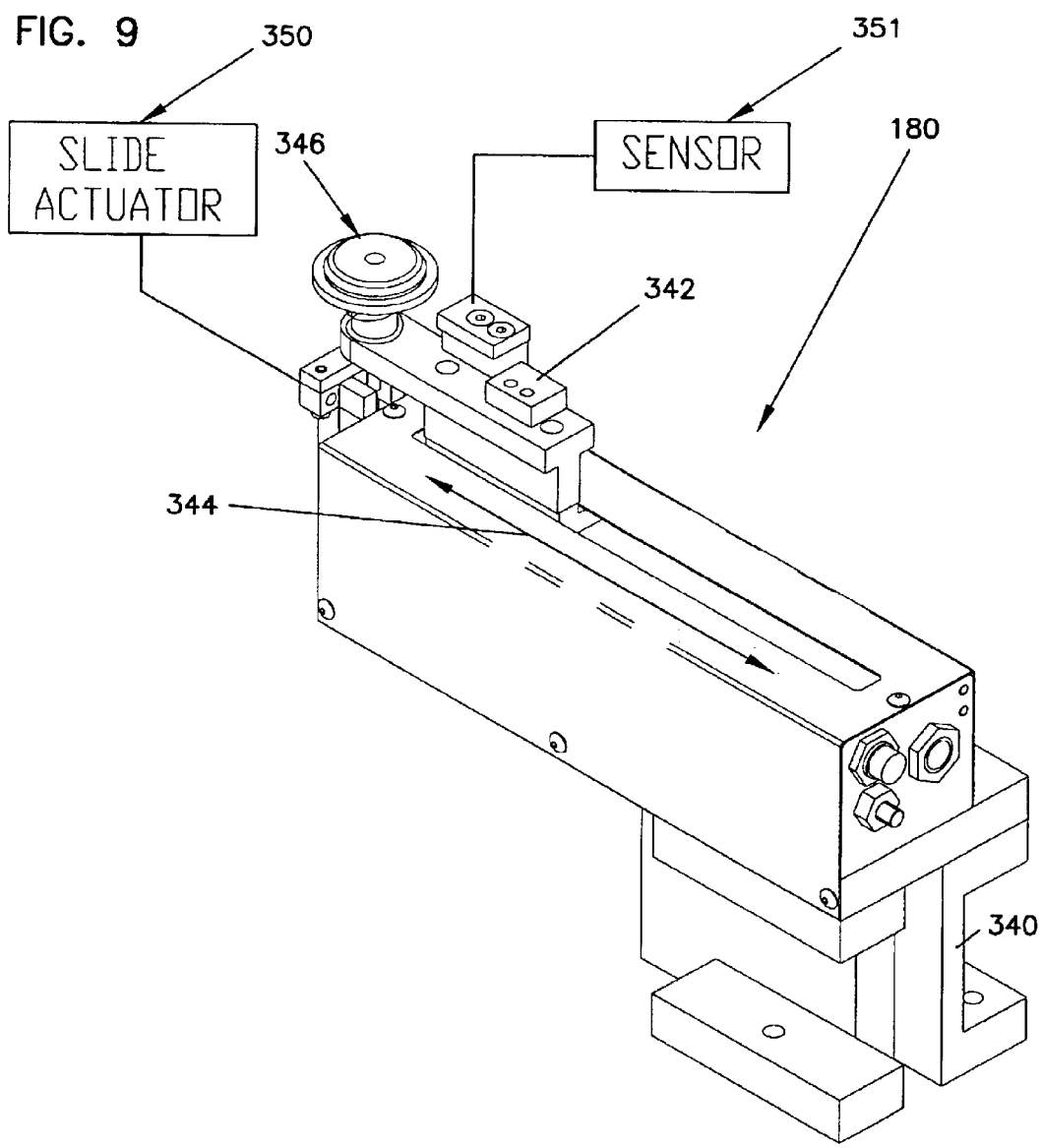

ASSEMBLY DEVICE FOR ASSEMBLING COMPONENTS

CROSS-REFERENCE TO RELATED APPLICATION

This application claims priority to a U.S. Provisional Application Ser. No. 60/075,888, filed Feb. 25, 1998 and entitled "HIGH SPEED DISC STACKER".

FIELD OF THE INVENTION

The present invention relates to an apparatus for assembling components of a data storage system. In particular, the present invention relates to an improved assembly apparatus for high speed assembly operations.

BACKGROUND OF THE INVENTION

Data storage systems are known to store digitally encoded information on discs. Heads carrying transducer elements are supported relative to the discs to read and write data to and from discs. Discs are supported for rotation by a spindle motor. Typically a data storage system includes a plurality of stacked discs supported relative to the spindle motor which are separated by spacers to form a disc stack. Disc stacks are assembly by alternately assembling discs and spacers on the spindle motor.

Automated devices may be used to assemble discs and spacers. Automated devices are typically operated by production personnel. Production personnel operate the apparatus and load the assembly components for assembly. In past apparatus, the apparatus may remain idle while production personnel load components for assembly, thus, limiting production capacity. It is desirable to increase production capacity and assembly speed for such automated devices for increased disc drive production.

Disc drives are typically assembled in "clean rooms" to limit exposure to dust and debris. It is desirable to limit excessive handling of assembly components to reduce damage and contamination of components. The present invention addresses these and other problems, and offers other advantages over the prior art.

SUMMARY OF THE INVENTION

The present invention relates to an apparatus for assembling components of a data storage system. Assembly components are housed by a component storage member removably coupled to the frame of the apparatus for supporting a plurality of component stacks for automated assembly. The apparatus includes an assembly device coupled to the component storage member for sequentially unloading components and assembling the unloaded components in a data storage system. The apparatus is adapted for high capacity, production and speed assembly.

BRIEF DESCRIPTION OF THE DRAWINGS

FIG. 6-1 is an exploded view of the components of the carousel of FIG. 5.

FIG. 6-2 is an exploded view of an embodiment of a latch member for latching disc magazines to the disc carousel illustrated in FIG. 6-1.

FIG. 7 is a perspective view of an embodiment of a disc carousel base.

FIG. 8 is a perspective view of an embodiment of a disc magazine cover remover.

FIG. 9 is a perspective view of an embodiment of an unloader device for unloading discs from magazines.

DETAILED DESCRIPTION OF THE PREFERRED EMBODIMENTS

Figure 1:
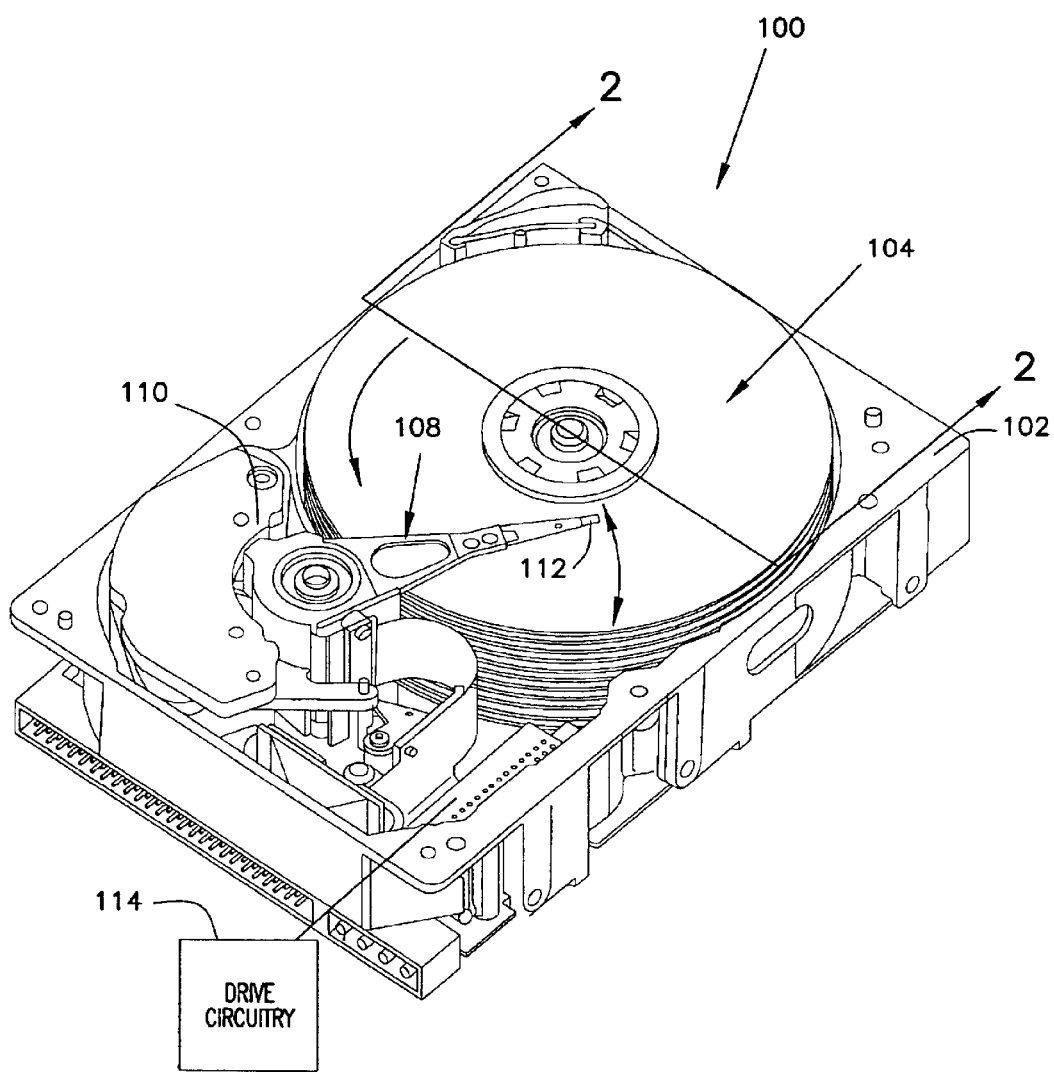
FIG. 1 is a perspective view of an embodiment of a disc drive.

The present invention relates to a system and apparatus for assembling a disc drive or data storage device. In particular, the present invention relates to a system and apparatus of a spindle motor for supporting discs of a data storage device as illustrated in FIG. 1. As shown, the data storage device 100 includes a base 102, a disc stack 104, an actuator block 108 and a voice coil motor 110. The actuator block 108 supports heads 112 (only one shown in FIG. 1) relative to the disc stack 104. The voice coil motor 110 is operably coupled to actuator block 108 for movement of the actuator block 108 along an arcuate path to position heads 112 supported thereby relative to selected data tracks of discs. Operation of the voice coil motor 110 and heads 112 is coupled to circuitry 114 of the disc dive.

Figure 2:
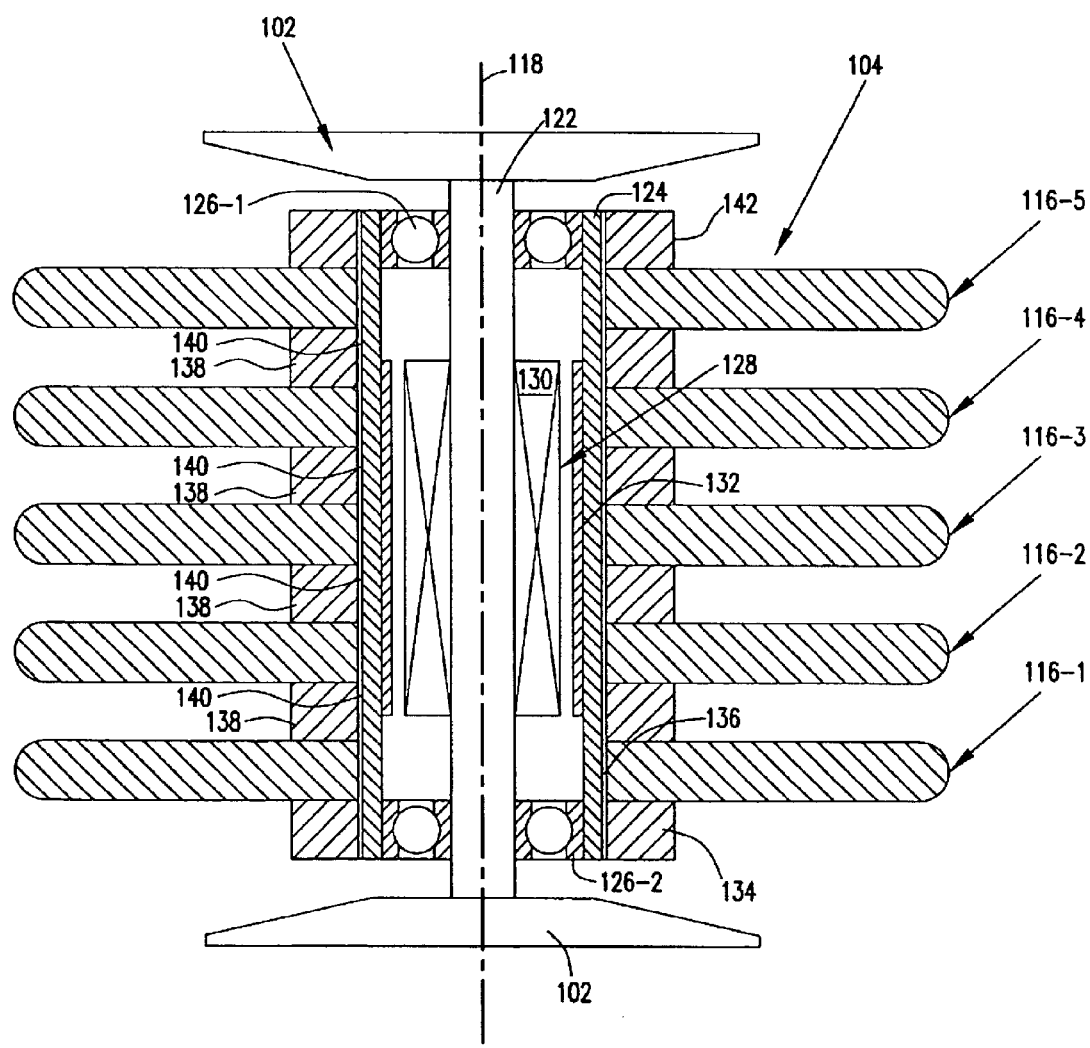
FIG. 2 is a cross-sectional view as taken along lines 2—2 of FIG. 1.

FIG. 2 is a sectional view taken along line 2—2 of FIG. 1 illustrating disc stack 104. As shown disc stack 104 includes a plurality of discs 116 supported for co-rotation about axis 118. Discs 116 are rotated via a spindle motor assembly coupled to the base 102 of the disc drive. The spindle motor assembly includes an inner shaft 122 and an outer shaft 124. The inner shaft 122 is fixedly secured to base 102 and outer shaft 124 is rotationally coupled to inner shaft 122 via bearings 126-1 and 126-2.

Discs 116 are supported relative to outer shaft 124 and the outer shaft 124 is rotated relative to inner shaft 122 via motor 128. Motor 128 includes a stator coil 130 (shown diagrammatically) coupled to shaft 122 and rotor magnet 132 coupled to outer shaft 124. Stator coil 130 (shown diagrammatically) is energized to rotate outer shaft 124 relative to inner shaft 122. Outer shaft 124 includes a ledge 134. Discs 116 are formed of a circular member having a central opening 136. Opening 136 is sized for placement over outer shaft 124 so that disc 116-1 is supported by ledge 134.

As shown, preferably, multiple discs 116-2 to 116-5 are supported via ledge 134 and are separated by ring-shaped spacers 138 having a central opening 140 sized for placement of spacers 138 about shaft 124. A clamp 142 axially clamps the discs and spacers 138 relative to ledge 134 to support discs 116 in stacked relation for operation of the data storage device. Although the disc stack 104 illustrated includes five (5) discs, it should be understood that the invention is not limited to a particular disc stack design or number of discs.

The present invention relates to an automated assembly apparatus and has particular application for assembling a disc stack 104. An embodiment of an apparatus for assembling a disc stack is illustrated in FIG. 1. Apparatus 150 includes a frame 152, spacer carousel 154, spacer assembly device 156, disc carousel 158-1, 158-2 and disc assembly device 160. The apparatus 150 is used to assemble a disc stack on an unassembled disk drive 161 which is supported along a conveyor 162. Discs are stored by the disc carousel 158-1 and 158-2 for assembly in a disc drive. Discs from carousel 1581, 158-2 are assembled in disc drive supported via conveyor 162 by disc assembly device 160. In the embodiment shown, multiple disc carousel 158-1, 158-2 are included and each are removably coupled to apparatus 150 for continuous assembly operation for high capacity production as will be explained.

Spacer carousel 154 supports a plurality of spacers 138 for assembly. After a disc is loaded on ledge 134, a spacer 138 is unloaded from spacer carousel 154 by spacer assembly device 156 and inserted on top of disc 116-1 for assembly of adjacent discs 116-2 to 116-n. The thickness of spacer 138 is sufficient for desired spacing between discs for operation of read/write heads.

Typically, discs are packaged and distributed in disc magazines 172 or cassettes. Disc magazine 172 supports a coaxially aligned series of discs 116 and is closed by a removable cover 174. As illustrated, carousels 158-1, 158-2 removably support a plurality of disc magazines 172. Preferably, the apparatus 150 of the present invention automatically removes cover 174 via cover removal assembly 176. Discs are unloaded from an uncovered magazine 172 via disc unloader 180 for assembly. Guard 182 assures that a single disc is unloaded at a time.

Spacer assembly device 156 and disc assembly device 160 alternately assemble spacers 138 and discs 116 in disc drive 161 and both include an assembly arm 190, and rotating base 192. The presence of a disc drive 161 is detected by sensor 194 for assembly. The rotating base 192 of spacer assembly device 154 supports arm 190 between first and second operating positions. In the first operating position, arm 190 is supported relative to spacer carousel 154 and in the second operating position, the arm 190 is positioned relative to disc drive 161. Thus in the first operating position, a spacer 138 is loaded and in the second operating position, a spacer 138 is assembled in the disc drive 161.

The rotating base 192 of disc assembly device 160 supports arm 190 between first and second operating positions. In the first operating position, arm 190 is aligned relative to the disc unloader 180 and in the second operating position, the arm 190 is supported relative to the disc drive 161 for assembly of the disc in the disc drive. Discs and spacer are alternately assembled in disc drive 161 via coordinated operation of the disc assembly device 160 and the spacer assembly device 156 as comparatively illustrated in FIG. 3-4.

Figure 3:
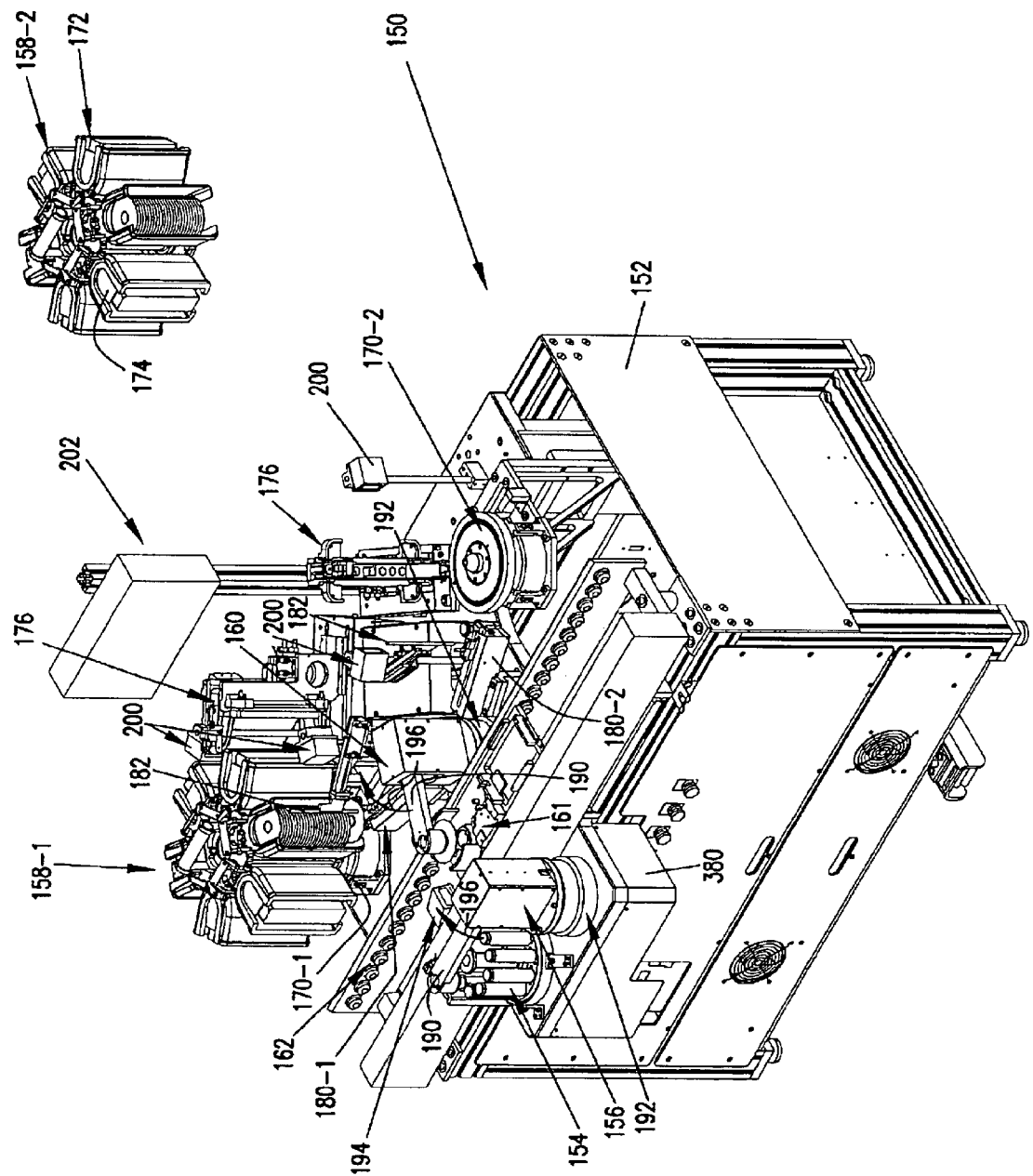
FIG. 3 is a perspective view of an embodiment of an assembly apparatus of the present invention.
Figure 4:
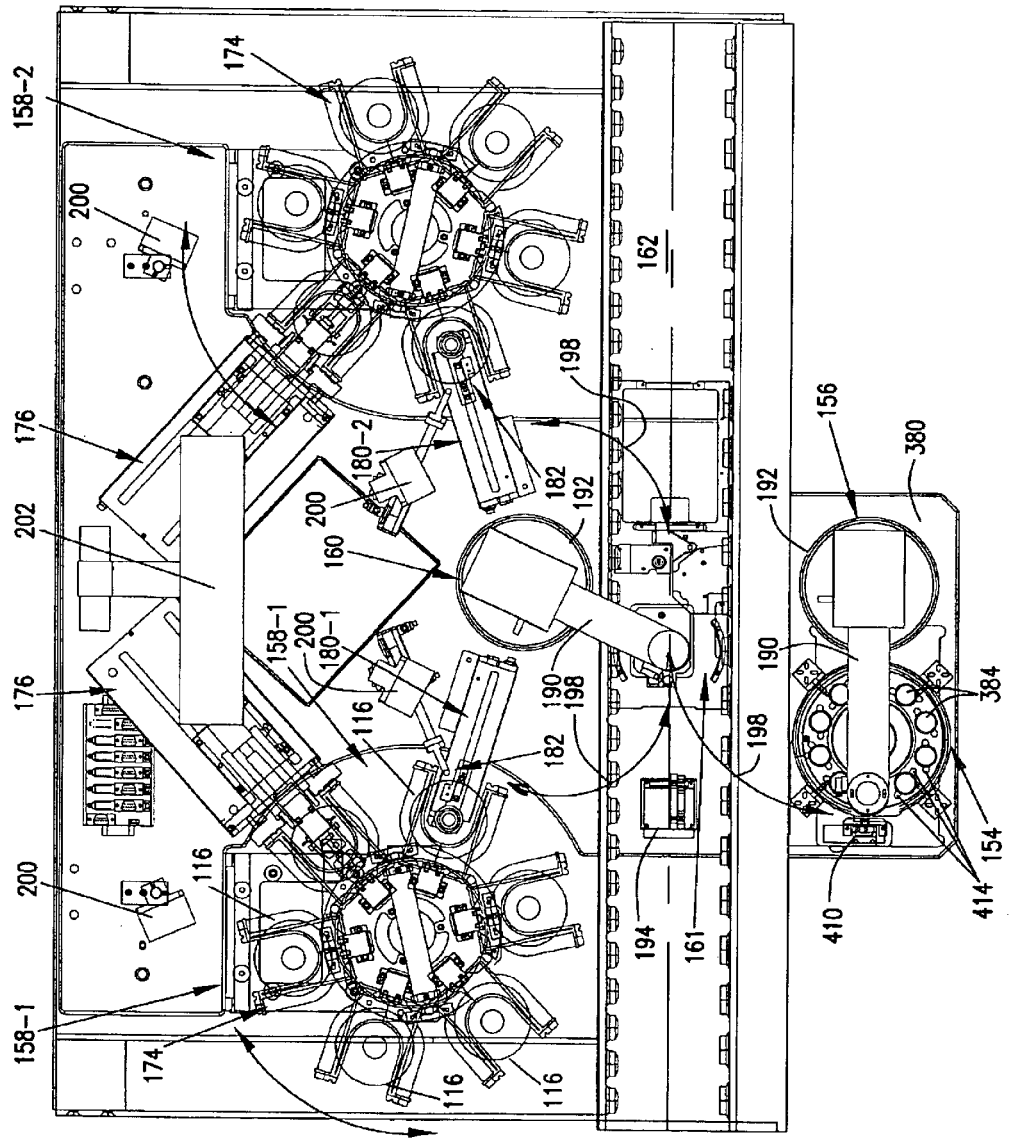
FIG. 4 is a top plan view of the operation of the apparatus of FIG. 3.

As shown in FIG. 3, spacer assembly device 156 is aligned with the spacer carousel 154 in a first operating position to load a spacer 138 for assembly while disc assembly device 160 is aligned with the disc drive in the second operating position for assembly of a disc in the disc drive. As illustrated in FIGS. 3–4, after a disc is assembled and spacer 138 is loaded to arm 190, bases 192 rotate as illustrated by arrow 196 so that arm 190 supporting spacer 138 is in the second operating position aligned with the disc drive and arm 190 of the disc assembly device 160 is in the first operating position aligned relative to the disc unloader 180 for picking a disc for assembly in the disc drive. Thereafter, bases 190 rotate as illustrated by arrow 198 of FIG. 4, so that arm 190 of the spacer assembly device 156 is again aligned with carousel 154 and arm 190 of disc assembly device 160 is aligned with a disc drive on conveyor 162 as illustrated in FIG. 3.

In the apparatus 150 shown, multiple carousels 158-1, 158-2 are included. The arm 190 of the disc assembly device 160 operates between the multiple carousels 158-1, 158-2. The apparatus 150 includes multiple unloaders 180 aligned with each carousel 158-1, 158-2 for feeding discs to disc assembly device 160. Thus, arm 190 alternately operates for multiple carousels 158-1, 158-2. Preferably, operation of the apparatus is coupled to a computer which may be interactively controlled in cooperation with display 202. Bar code scanners 200 are preferably included for recording control numbers for discs assembled.

Figure 5:
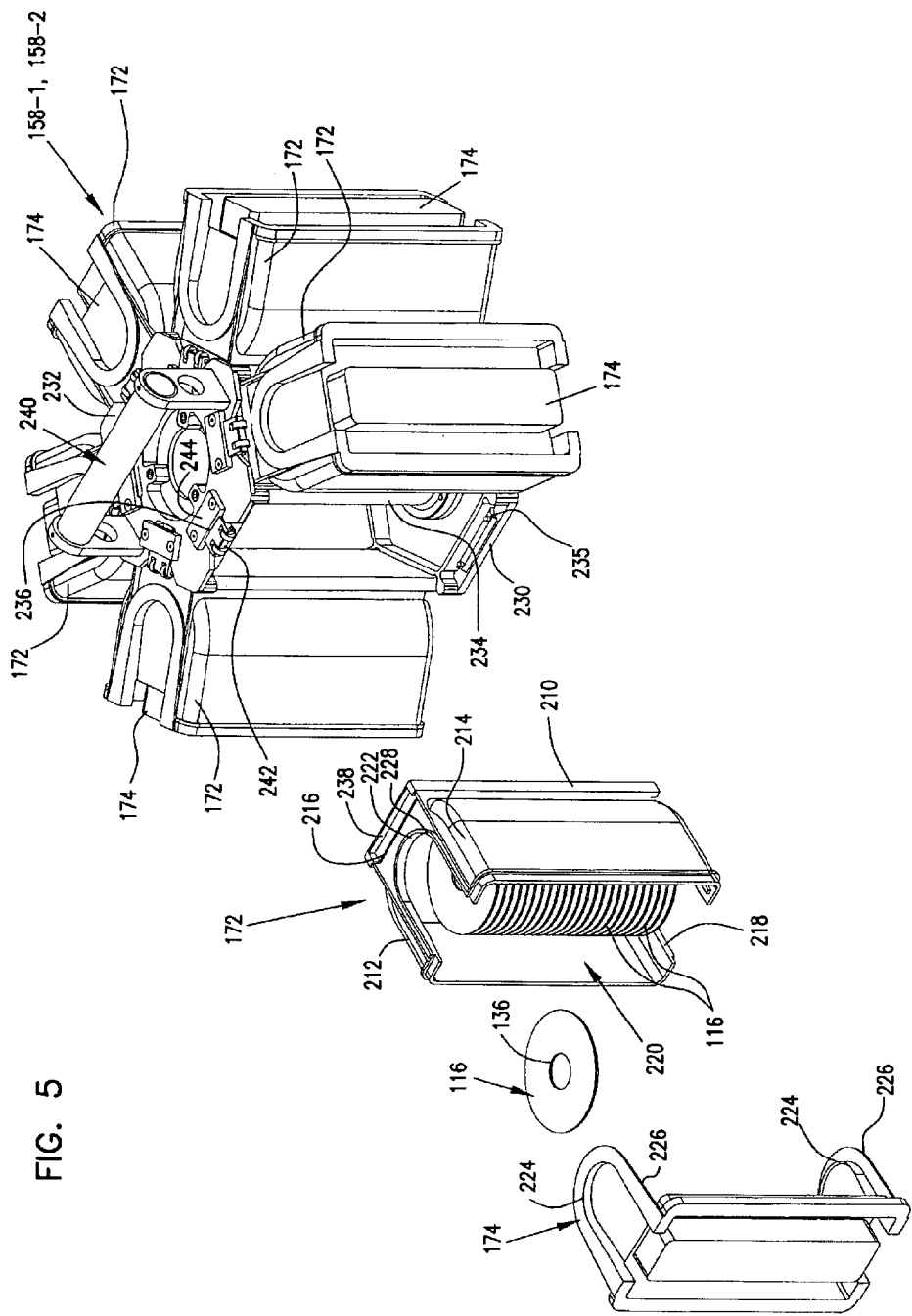
FIG. 5 is a perspective view an embodiment of a disc carousel supporting disc magazines or containers for assembly of discs.

As shown in FIG. 5, and previously explained, carousels 158-1, 158-2 support a plurality of prepackaged disc magazines 172 for high capacity operation so discs do not need to be separately staked and loaded by an operator. An example magazine 172 includes a base 210, side walls 212, 214 and opposed end walls 216, 218 forming an inner cavity 220 for storing a plurality of coaxially aligned discs 116. Discs extend between opposed end walls 216, 218 with the center of discs 116 coaxially aligned along a stack axis aligned along side walls 212, 214. Opposed end walls 216, 218 are "U" shaped to form openings 222. Cover 174 closes cavity 220 and includes flaps 224 which removably secure cover 174 to end walls 216, 218. In particular, flaps 224 are formed of a relatively flexible material and include lips 226 which snap fit about rims 228 on end walls 216, 218. Although a particular magazine 172 structure is described, carousel 158-1, 158-2 may be adapted to support alternate magazine structures.

Figures 1, 6:
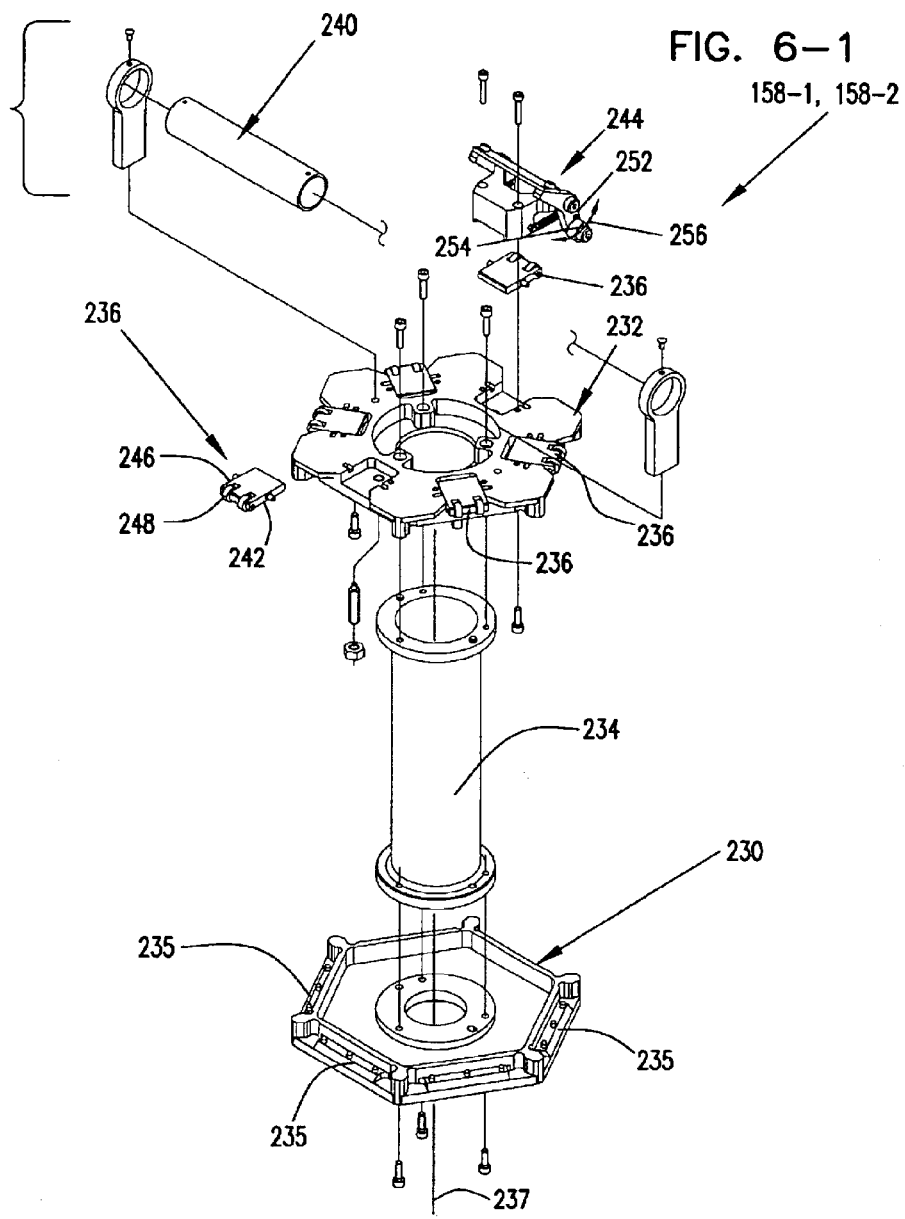
Figures 2, 6:
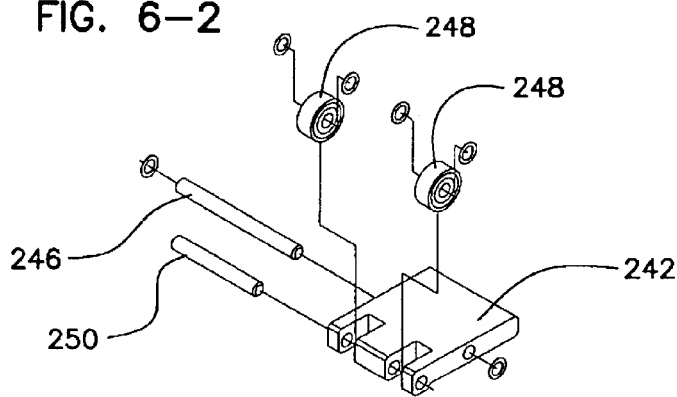

As shown, carousels 158-1, 158-2 support multiple magazines 172 in concentric alignment for rotary operation of carousel 158-1, 158-2 as will be explained. As illustrated in FIG. 6-1, carousel includes a base platform 230 and upper platform 232 supported in spaced relation via post 234 to form the frame of the carousel 158-1, 158-2. Upper and lower platforms 230, 232 include a plurality of spaced latch members 235, 236, respectively located about a center axis 237 of the upper and lower platforms 232, 234 to form a plurality of concentrically spaced magazine stations. Magazines 174 are supported at magazine stations about axis 237 via cooperating latch members 235, 236 on platforms 230, 232.

Latch member 235 is formed of a raised lip which engages a lip (not shown) on end wall 218 and latch member 236 is a flexible latch which is designed to engage lip 238 on end wall 216. In the embodiment shown, latch members 235, 236 are supported about the perimeter of upper and lower platforms 230, 232 which are hexagonal shaped to form six sides. Latch members 235, 236 are included at each of the six sides to provide six magazine stations about the outer perimeter of platforms 230, 232. Carousel 158-1, 158-2 includes a handle 240 or loading and unloading a carousel for operation.

FIGS. 6-1 and 6-2 illustrate latch member 236 which includes latch plate 242 and latch plate cover 244. Latch plate 242 includes mounting pin 246 and rollers 248. Latch plate 242 and mounting pin 246 extend into a recess on platform 232 and are movably secured therein via latch plate cover 244. Rollers 248 are coupled to latch plate 242 via rod 250. Contact of rollers 248 with lip 238 on end wall 216 biases latch plate 242 against latch plate cover 244 to advance rollers 248 over lip 238. Once the rollers 248 are advanced over lip 238 latch plate cover 244 biases the rollers 248 toward end wall 216 to releasably secure magazines 172 between platforms 230, 232.

In one embodiment of carousel 158-1, 158-2, plate cover 244 is a flat plate as illustrated in FIG. 5. In the embodiment of the plate cover 244 illustrated in FIG. 6-1, plate cover 244 includes pivot arm 252 supporting roller 254. Pivot arm 252 rotates as illustrated by arrow 256 to allow roller 254 to selectively engage and disengage magazines 172 at lip 238 to selectively attach and dettach magazines 172 relative to carousels 158-1, 158-2. Magazines 172 are removably supported by the disc carousel 158-1, 158-2 so emptied magazines 172 may be easily replaced by filled magazines 172. Since the entire magazine 172 removably coupled to carousel 158-1, 158-2, discs do not need to be individual stacked on carousel 158-1, 158-2 for assembly.

Carousels 158-1, 158-2 are preferably rotatably supported by base 170 for rotation about a center rotation axis 258 aligned with axis 237 for selectively aligning individual magazine stations for unload and assembly operations. A preferred embodiment of base 170 is illustrated in detail in FIG. 7 and includes a support table 260, vacuum lock assembly 262, and a servo-motor 264. Table 260 supports carousel 158-1, 158-2 and includes center post 266 aligned with rotation axis 258.

Carousel 158-1, 158-2 are removably supported on table 260 via vacuum lock assembly 262 which provides suction via holes 268 coupled to a vacuum source 269 (shown schematically) to retain carousel on base 170 for operation. Vacuum is selectively supplied to engage and disengage carousel. Servo-motor 264 rotates carousel 158-1, 158-2 for placement of selected magazines 172 via cover removal assembly 176 and unloader 180 for operation.

Magazines are coupled to magazine stations via latch members 235, 236 so that the stack axis of discs is parallel to the rotation axis. As previously explained, unloader 180 unloads discs for assembly via disc assembly device 160. Base 170 rotates carousels 158-1, 158-2 to position magazines 172 relative to the unloader 180. In the embodiment shown, unloader 180 is supported at a fixed elevation by frame 152. To sequentially align unloader 180 with each disc in magazine 172, base 170 is movably supported by an elevator assembly 270 to raise and lower carousel 158-1, 158-2 as illustrated by arrow 272 to align sequential discs in the disc magazine with the unloader 180.

The elevator assembly 270 includes a track 274 which is fixedly coupled to frame 152 and lift 276 which moves along track 274 via a stepper motor 278. Base 170 is coupled to lift 276 and movable therewith via platform 280. Platform 280 is coupled to the elevator assembly 270 to selectively raise and lower the base 170 and carousel 158-1, 158-2 supported thereby. The carousel is raised and lowered to sequentially align discs stacked in a disc magazine 172 with the unloader 180.

Magazines are loaded onto carousel 158-1, 158-2 with covers 174 closing inner cavity 220 to limit contamination. Prior to assembly of discs from magazines 172, cover 174 is removed by cover removal assembly 150. To remove cover 148, carousel 158-1, 158-2 is rotated as previously explained to align a selected magazine 172 with the cover removal assembly 176. FIG. 8 is a perspective view of the cover removal assembly 176. The cover removal assembly 176 includes a base platform 290, posts 292, upper and lower cover grippers 294, 296. Posts 292 are supported by base platform 290 and support upper and lower cover grippers 294, 296 to engage flaps 224 to remove cover 174 from magazine 172. Upper and lower cover grippers 294, 296 include arms 300, 302 and fingers 304, 306, respectively. Arms 300, 302 support fingers 304, 306 which are adapted to engage flaps 224 to flex flaps to remove lip 226 from rim 228.

Arms 300, 302 are pivotally connected to posts 292 to pivot as illustrated by arrow 308 to open and close. Arms 300, 302 are pivoted via slide 310 operably coupled to arms 300, 302 and movable along track 312 via a pneumatic actuation device 314. Fingers 304, 306 are pivotally connected to arms 300, 302 as illustrated by arrow 320 to rotate prongs 322 on fingers 304, 306 to selectively engage flaps 224 on cover 174. Fingers 304, 306 are pivoted or operated via a pneumatic actuation device 326 operably coupled to fingers 304, 306. Thus, as described, upper and lower grippers 294, 296 are actuated between an opened position and a closed gripping position to remove cover 174 from magazine 172.

Thus for assembly, base 170 is rotated via motor 264 to position magazines 172 supported at spaced magazine stations relative to the cover removal assembly 176 as shown in FIG. 8 to remove cover 174. Thereafter, base 170 rotates to align uncovered magazines 172 with the disc unloader 180. Each carousel 158-1, 158-2 has a disc unloader 180 aligned relative to the carousel 158-1, 158-2 and disc assembly device 160. FIG. 9 is a detailed perspective view of the disc unloader 180. Disc unloader 180 includes a pedestal 340 coupled to frame 152 between disc assembly device 160 and carousel 158-1, 158-2 to shuttle discs from a carousel 158-1, 158-2 to disc assembly device 160 for assembly in a disc drive 161.

As shown disc unloader 180 includes a slide 342 movably along a track (not shown) as illustrated by arrow 344 between a first shuttle position at carousel 158-1, 158-2 to a second shuttle position at disc assembly device 160. Slide 342 supports disc post 346 which is formed of a truncated cylindrical member sized for insertion through center opening 136 of disc 116. Post 346 is spring biased upwardly for insertion through center opening 136 of disc. Slider 342 is operated between the first shuttle position and second shuttle position via slider actuator 350 which preferably is a pneumatic cylinder, but may include alternate actuation devices.

In the first shuttle position, disc post 346 is coaxial with and beneath opening 222 of magazine 172 to align with center opening 136 of discs. Sensor 351 (shown diagrammatically) on slide 342 detects whether a disc is present for engagement by post 346 for unload. If no disc is detected, base 170 is incrementally lowered via elevator assembly 270 and the process is repeated until a disc is detected.

Figure 10:
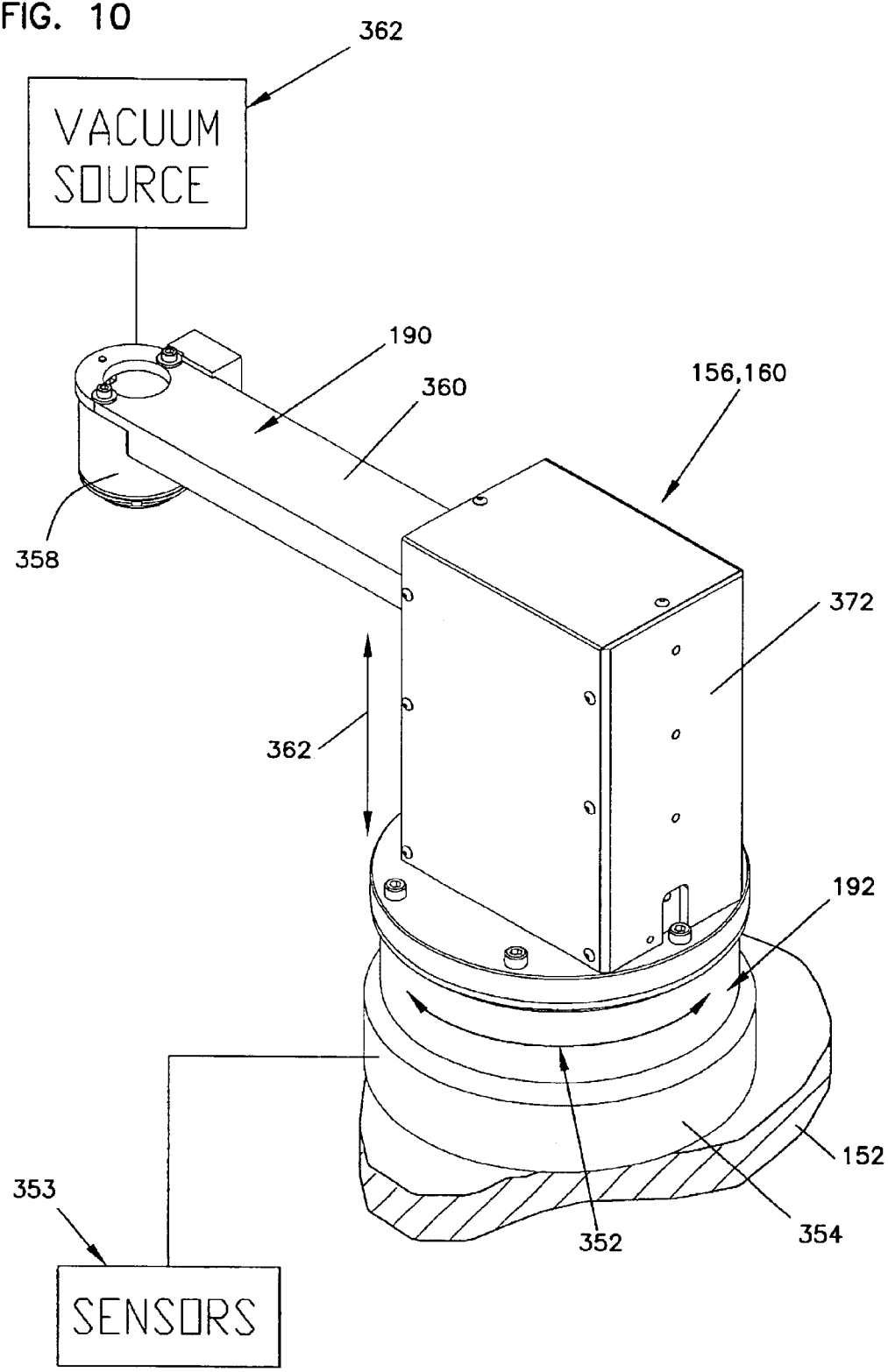
FIG. 10 is an embodiment of a device for assembling spacers and discs in a disc drive.
Figure 11:
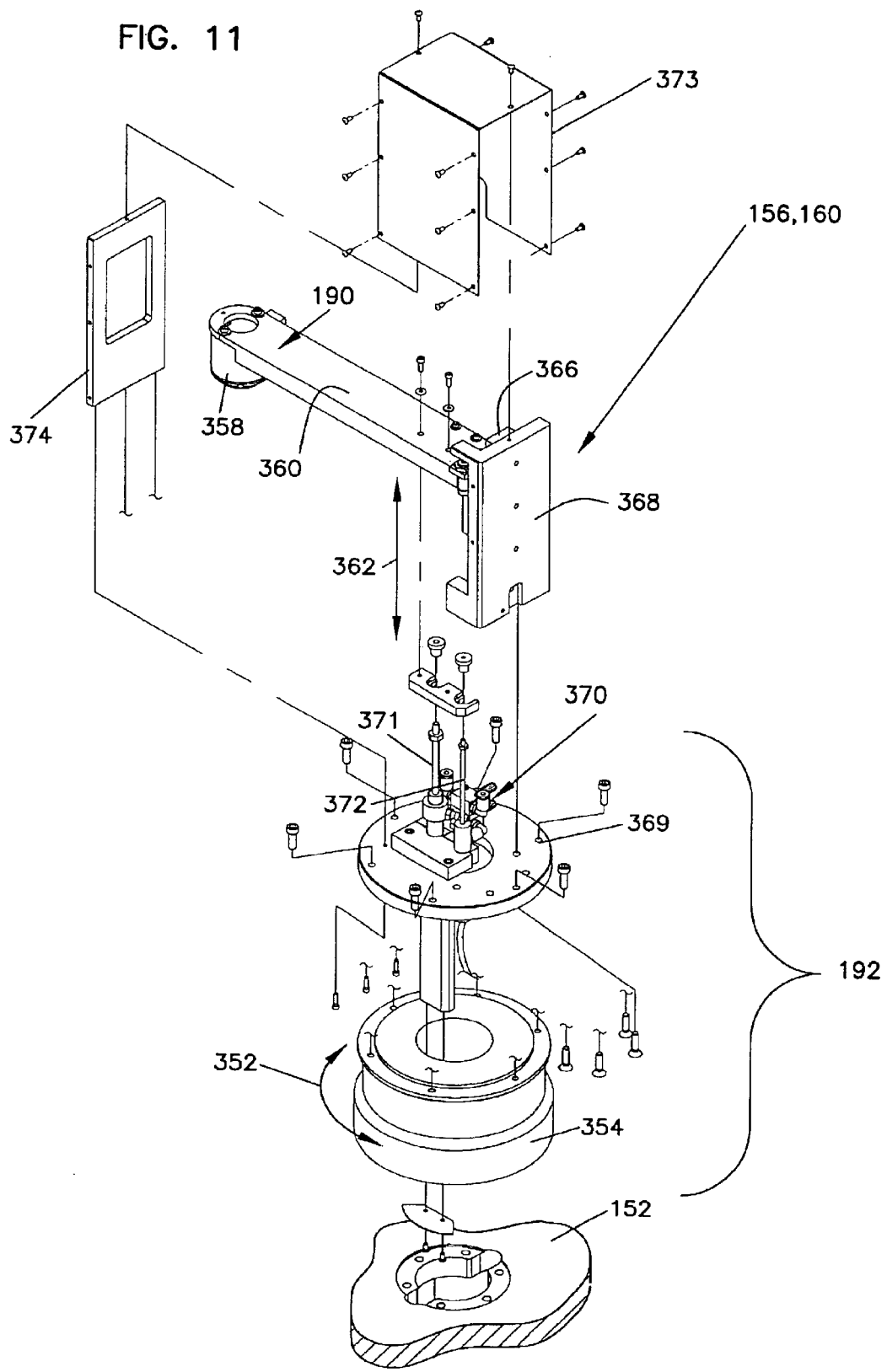
FIG. 11 is an exploded view of the assembly device of FIG. 10.
Figure 12:
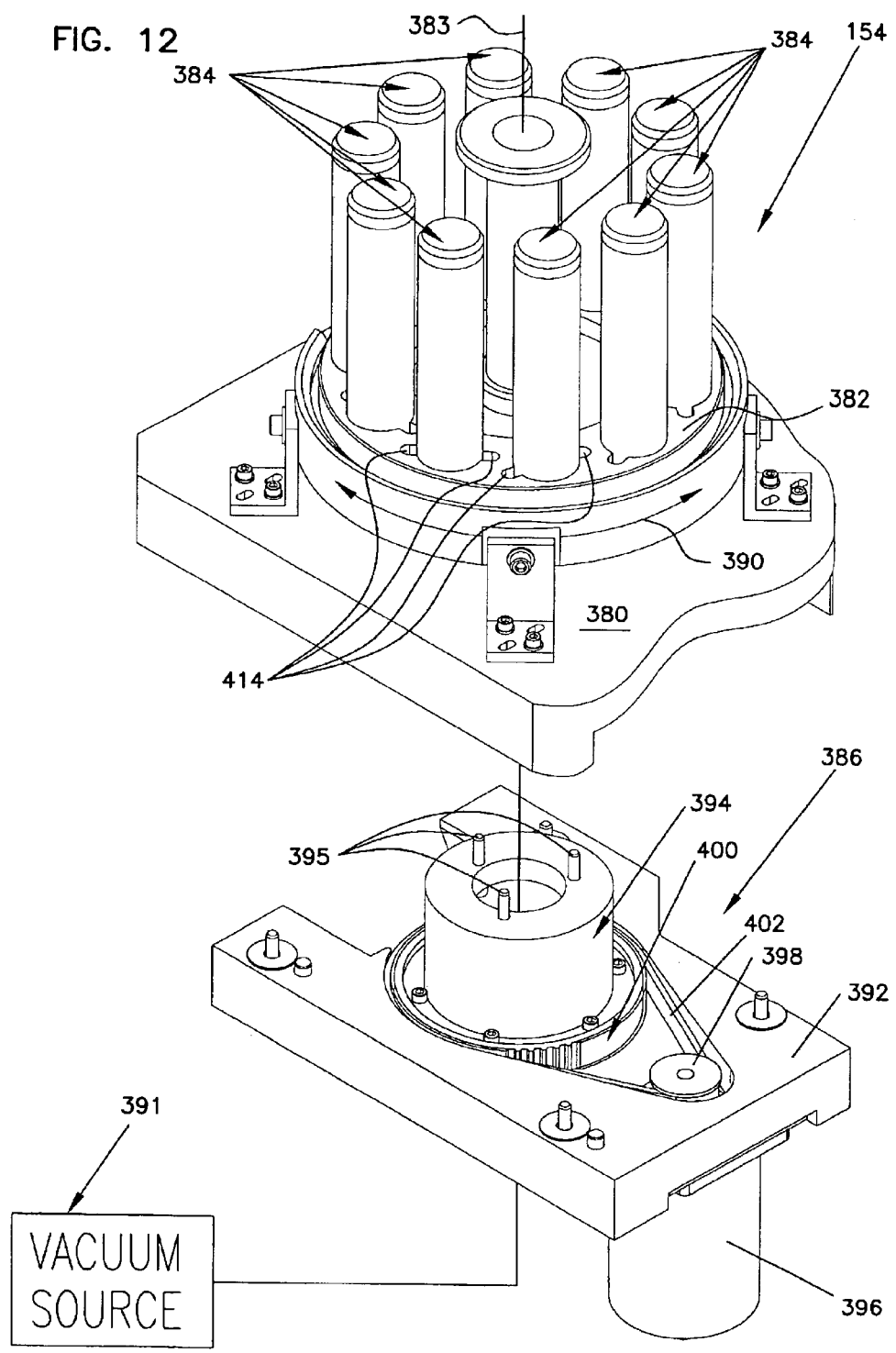
FIG. 12 is an exploded perspective view of an embodiment of a spacer carousel and base therefor.

FIGS. 10–12 illustrate components of the disc assembly device 160 and spacer ring assembly device 156. As shown rotating base 192 rotates as illustrated by arrow 352 via servo motor 354 coupled to frame 152. Sensor 353 (shown schematically) monitors the position of the base 192 for operating the servo-motor 354. Arm 190 is operably coupled to base 192 for rotation via motor 354. Arm 190 includes a vacuum chuck 358 and arm extension 360. Arm extension 360 is movably supported relative to base 192 to raise and lower chuck 358 as illustrated by arrow 362 between a lower gripping position and a raised transport position vacuum is supplied to chuck 358 via a vacuum generator 362 (shown diagrammatically).

As illustrated in further detail in FIG. 11, arm extension 360 is moveable along track 366. Track 366 is supported via bracket 368 supported by plate 369 coupled to motor 354. Arm extension 360 is movable along track 366 via an actuation assembly 370 which preferably includes a pneumatic cylinder 371 for raising and lowering chuck 358, but other devices such as servo/stepper motor could be used. A linear transducer 372 is coupled to extension 360 to monitor position of extension 360 for controlling up and down operation of extension 360. Cover 373 and face plate 374 enclose actuation assembly 370.

Discs unloaded from magazine 172 via unloader 180 are moved to the second shuttle position aligned with the disc assembly device 160. Arm 190 of the disc assembly device 160 is rotated by motor 354 as illustrated by arrow 352 to align chuck 358 with post 346 supporting a disc. Arm 190 is lowered so that chuck 358 is in close proximity to the disc. Vacuum pressure is supplied to chuck 358 to grip the disc. Thereafter arm 190 is raised as illustrated by arrow 362 and rotated to align with an unassembled disc drive 161. Arm 190 is lowered to assembly the disc on the spindle motor of disc drive 161.

As previously explained, once a discs is unloaded via unloader 180, lift 276 is incrementally lowered via stepper motor 278 to align the next sequential disc relative to post 346 of unloader 180. Guard 182 includes a longitudinally aligned rod as illustrated in FIG. 3. The rod is supported so that a lower disc being unloaded passes underneath while the remaining discs are maintained in the magazine 172 to assure that a single disc is unloaded during an operation cycle.

The spacer assembly device 156 operates similar to the disc assembly device to sequentially unload spacers 138 from spacer carousel 154. FIG. 12 is a perspective view of carousel 154 supported by platform 380 coupled to frame 152 proximate to conveyor 162. Preferably, carousel 154 includes base 382 removably supported for rotation about a rotation axis 383. Base 382 supports a plurality of spacer posts 384 at spaced positions concentrically with rotation axis so that base 382 rotates about rotation axis 383 for selectively aligning multiple posts 384 for assembly operation.

Posts 384 are formed of elongated cylindrical members having a diameter sized to extend through opening 140 of spacers 138 to support a plurality of spacers 138 in stacked alignment. Carousel 154 is removably coupled to a rotary assembly 386 for rotating carousel 154 as illustrated by arrow 390 for sequentially positioning posts 384 for unloading spacers 138 supported by each post 384. Base 382 of carousel 154 is removably coupled to platform 380 via a pneumatic lock assembly (not visible) coupled to a vacuum source 391.

Rotary assembly 386 includes base 392 supporting rotary table 394 coupled to carousel base 382 via pins 395. Rotary table 394 is rotated via motor 396 in cooperation with pulley wheel 398 rotated by motor 396 and pulley wheel 400 coupled to rotary table 394. Pulley wheel 400 is rotated via belt 402 coupled to pulley wheel 398. Motor 396 operates to incrementally position filled posts 384 relative chuck 358 of spacer assembly device 156.

Figure 13:
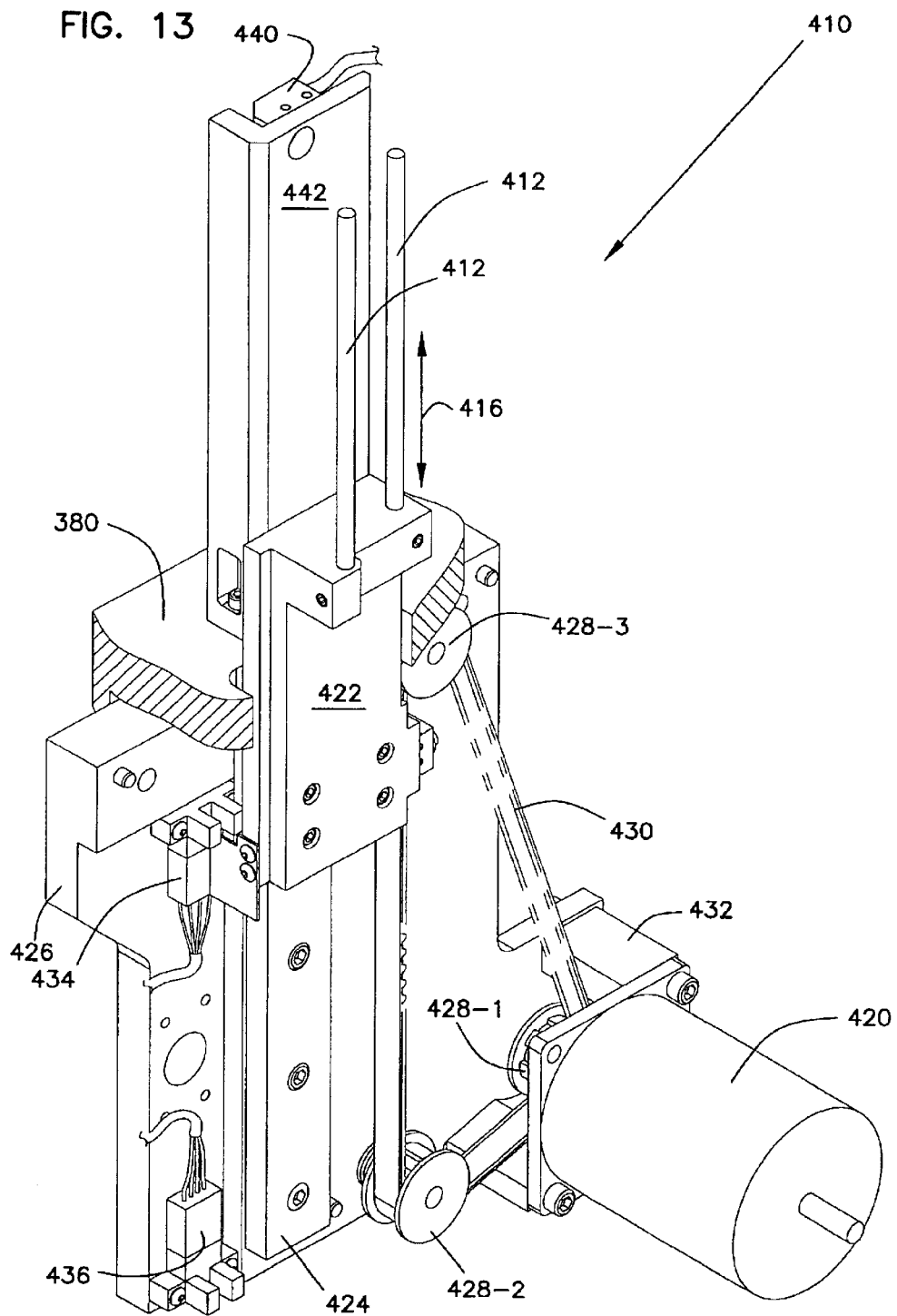
FIG. 13 is a perspective view of an embodiment of an indexer for indexing spacers supported by spacer carousel.

Stacks of spacers 138 supported by posts 384 are incrementally raised to align with chuck 358 via spacer elevator 410 as illustrated in FIG. 13. Spacer elevator 410 is supported relative to platform 380 and includes moveable elevator rods 412 which extend through pin holes 414 on base 382 of spacer carousel 154 to contact spacers 138 supported by posts 384. Elevator rods 412 are movable as illustrated by arrow 416 to raise elevator rods 412 to contact and move spacers 138 for alignment with chuck 358 of the spacer assembly device 156. Elevator rods 412 are raised and lowered via motor 420.

Pins 412 are supported on slide 422 movable along track 424 coupled to platform 380 via bracket 426. Slide 422 is operably coupled to motor 420 for movement thereby via pulleys 428-1, 418-2, 418-3 and belt 430. Motor 420 is coupled to bracket 426 via block 432 and supported thereby. Stepper motor 420 rotates pulley 428-1 to move belt 430. Belt 430 is coupled to slide 422 to raise and lower pins 412 coupled thereto. Thus, each time a spacer 138 is unloaded for assembly from a post 384, motor incrementally raises pins 412 to elevate stacked spacers 138 supported by posts 382 at an assembly elevation for operation of the spacer assembly device 156.

Operation of slide 422 along track 424 is controlled by opposed spaced stroke sensors 434, 436. Sensor 440 is supported by block 442 coupled to platform 380 to detect a spacer 138 at an assembly elevation to control operation of indexer 410 for raising spacers 138 to the assembly elevation and operate motor 396 to rotate spacer carousel 154 to index to the next post 384 when a post 384 is emptied.

Figure 14:
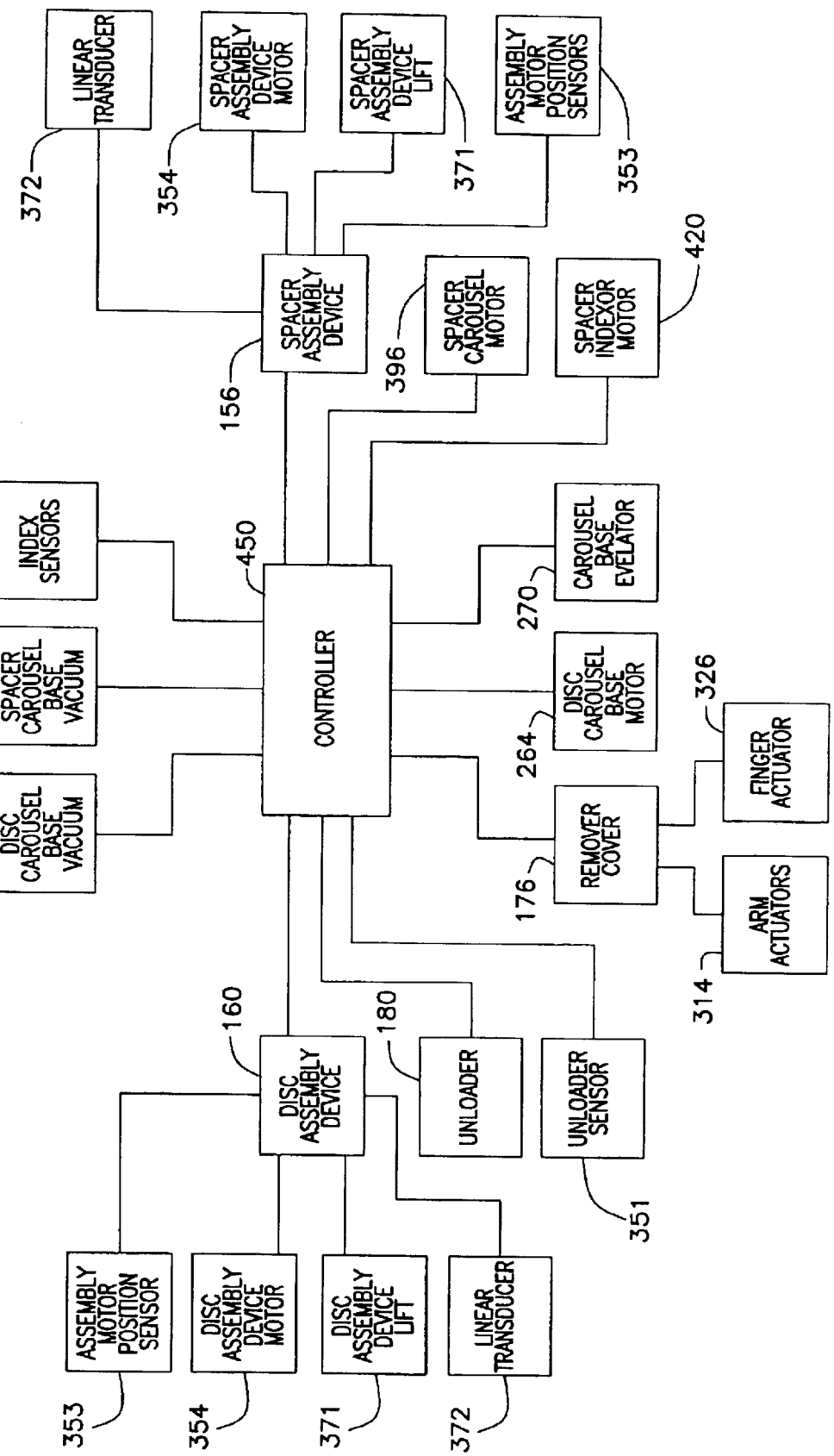
FIG. 14 is a block diagram illustrating automated operation of components of the apparatus illustrated in FIG. 3.
Figure 15:
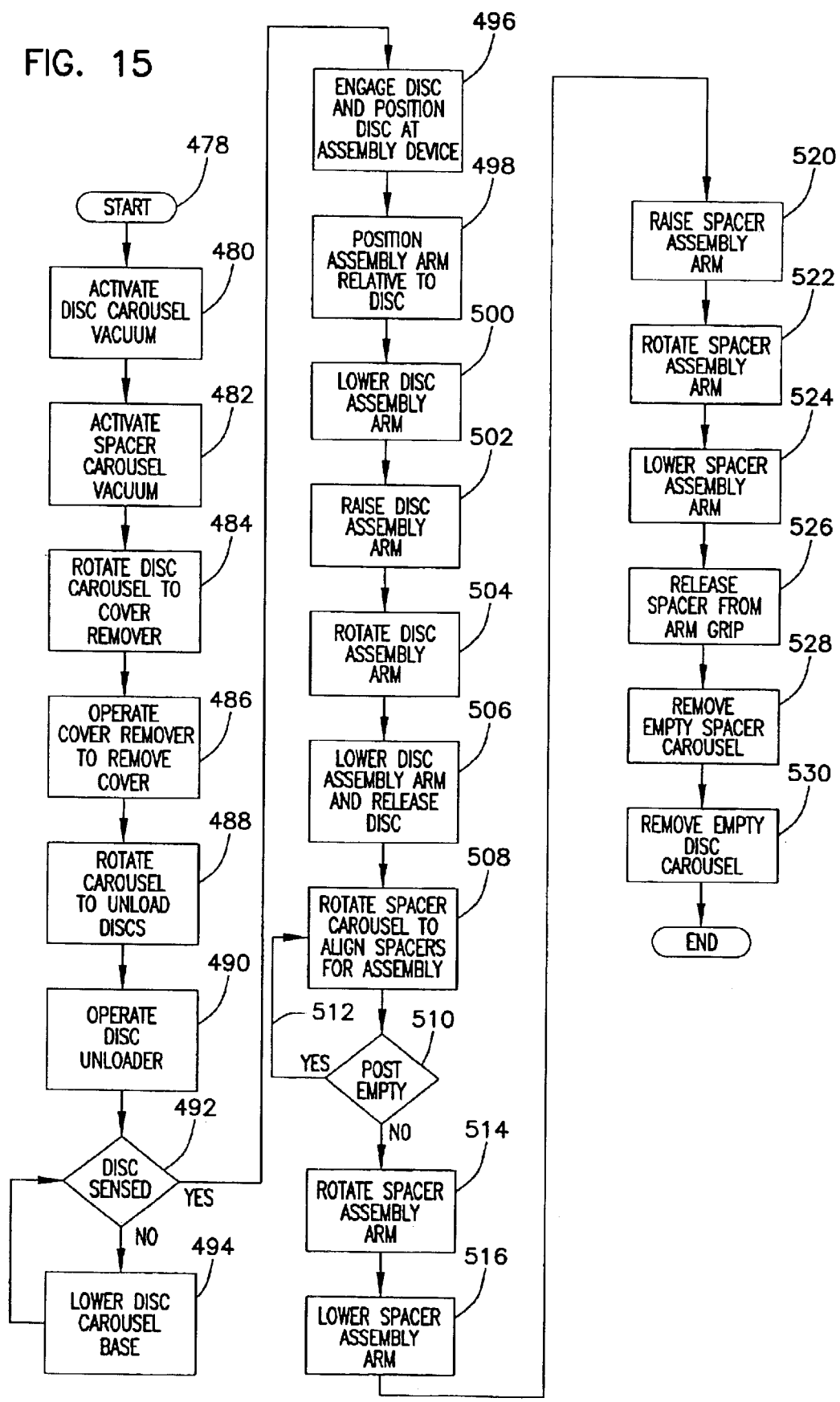
FIG. 15 is flow chart illustrating operation of the apparatus illustrated in FIG. 3.

As shown in FIG. 14, operation of apparatus 150 is controlled by controller 450. In particular, disc carousel base vacuum 262, spacer carousel base vacuum 391, disc assembly device 160, unloader 180, cover remover 176, carousel base motor 364, carousel base elevator 270, spacer assembly device 156, spacer carousel motor 396 and spacer indexer motor 420 are coupled to controller 450 for controlling sequence of operation for alternately assembling a disc 116 and spacer 138. Sensors are coupled to controller as shown for controlling sequence of operation. FIG. 15 is a simplified flow chart of operation of apparatus 150. To begin as illustrated by block 478, carousels 154, 158-1, 158-2 are loaded on respective carousel bases and vacuum sources are actuated to hold carousels to bases for operation as illustrated by blocks 480, 482.

Controller 450 operates motor 264 to rotate base 170 for alignment with cover remover 176 as illustrated by block 486. Controller 450 initiates operation of cover remover 176 to actuate arms 300, 302 and fingers 304, 306 to remove cover 174. After cover 174 is removed controller operates motor 264 to rotate carousel 158-1, 158-2 to an unload position to align the uncovered magazine 172 with disc unloader 180 as illustrated by block 488. Controller 450 operates motors 264 of bases 170-1, 170-2 to cover and uncover a magazine for one carousel 158-1 while another carousel 2158-2 is unloading discs 116 for continuous operation without interruption.

Controller 450 sequentially operates unloaders 180-1, 180-2 for unloading discs from an uncovered magazine positioned at the load position as illustrated by block 490. For unload operations, disc post 346 is moved via slide actuator 350 to align with magazine opening 222. Sensor 351 detects if a disc is stored relative to an operation plane of the disc post 346 as illustrated by block 492. If no disc is sensed then controller 450 operates carousel base elevator 270 to incrementally lower carousel 158 until a disc is sensed as illustrated by block 494. Post 346 is spring biased upwardly to engage disc 116 and is moved via operation of slide 342 to an assembly position to align with disc assembly device 160 as illustrated by block 496.

As previously explained, the discs unloaded from carousel 158-1, 158-2 are assembled in disc drive 161 via device 160. Controller operates motor 354 to rotate arm 190 of device 160 to align with post 346 as illustrated by block 498. Controller 450 operates an actuation assembly 370 to lower pneumatic chuck 358 to engage disc 116 on post 346 as illustrated by block 500. Thereafter actuation assembly 370 raises arm 190 with disc attached to chuck 358 and motor 354 rotates arm 190 to align with disc drive 161 as illustrated by blocks 502, 504. Arm 190 is again lowered to disc drive 161 and chuck 358 releases disc 116 for assembly in disc drive as illustrated by block 506.

After a disc is assembled, a spacer is assembled to separate multiple discs. Controller 450 operates motor 396 to rotate spacer carousel 154 to a selected position for operation as illustrated by block 508. Initially controller 450 operates motor 396 to rotate carousel 154 to a first operating position as controlled by a position sensor (not shown). Sensor 440 detects whether a posts 384 aligned with spacer assembly device 156 at the operating position has spacers 138 supported thereby as illustrated by block 510. If sensor 440 detects an empty post, controller operates motor 396 to rotate carousel 154 to a filled post 384 as illustrated by feedback line 512.

To assembly a spacer 138 on top of disc 116, arm 190 of spacer assembly device 156 rotates via motor 354 as illustrated by block 514 and arm 190 is lowered as illustrated by block 516 to grip spacer 138. Arm 190 is raised by actuation assembly 370 as illustrated by block 520 and rotated via motor 354 to align with the disc drive as illustrated by block 522. Arm 190 is lowered and pneumatic chuck 358 released to load spacer as illustrated by blocks 524, 526. Empty spacer and disc carousels are removed from apparatus 150 as illustrated by blocks 528, 530.

Each time a spacer is removed from carousel 154, controller 450 operates spacer indexer 410 to index spacers 138 supported by the post 384 upwardly for unloading to limit the stoke of the spacer assembly device 156 for increased operating speed. Spacers 138 are continuously unloaded from post 384 and indexed upwardly until sensor 440 detects an empty post 384 and signals the controller 450 to operated motor 396 to rotate carousel 154 to the next post 384. Operation of apparatus 150 is synchronized so that while one carousel 158-1 is unloaded, motor 354 rotates the other carousel 158-2 to cover an unloaded magazine 172 and uncover a new filled magazine 172 for unload operations. Preferably, operations are also synchronized so that while a disc is being unloaded via unloader 180, a spacer is being assembled in a disc drive by the spacer assembly device 156 and while a spacer is being unloaded, a disc is being assembled by the disc assembly device 160 for high speed and high capacity operation.

Thus as described, the present invention relates to an apparatus 150 for assembling components of a data storage system. In particular, apparatus 150 is used to assembly discs 116 and spacers 138 of a spindle motor for a data storage device 100. Assembly components, such as spacers 138 and discs 116 are housed by component storage member 154, 158-1, 158-2 which are removably coupled to the frame of the apparatus so that the storage members may be loaded with components for assembly without interrupting operation of the machine. Assembly devices 156, 160 are included for assembling unloaded components in a disc drive supported on conveyor 162.

The present invention provides a fully automated assembly apparatus with increased production and assembly speed. As shown, disc carousel 158-1, 158-2 removably supports a plurality of disc magazines 174 for increased capacity. As shown filled disc magazines 174 may be loaded onto disc carousels 158-1, 158-2 without unloading discs from pre-packaged magazines 174 to limit damage to discs caused by excessive handling and reduce production steps for assembling spindle motors. As shown, multiple carousels 158-1, 158-2 allow the apparatus to continue to operate while an emptied carousel is reloaded with filled disc magazines.

As shown, spacer and disc carousels include a plurality of components stacks arranged about an axis aligned with the rotation axis of the carousel for rapidly orientating sequential stacks via rotation with an assembly device. The carousels having multiple component stacks which are rotatably aligned with an assembly device provide increased capacity and increases number of components that may be assembled from each carousel.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application or components assembled while maintaining substantially the same functionality without departing from the scope and spirit of the present invention. In addition, although the preferred embodiment described herein is directed to assembly of discs and spacers for a spindle motor for a data storage system, it will be appreciated by those skilled in the art that the teachings of the present invention can be applied to other systems, without departing from the scope and spirit present invention.

What is claimed is:

1. An assembly apparatus comprising:
   a frame;
   a carousel base rotationally coupled to the frame;
   a carousel coupling device to removably couple a component carousel including a plurality of assembly components to the carousel base;
   an assembly arm movably coupled to the frame; and
   a driver coupled to the assembly arm to move the assembly arm between first and second positions to sequentially unload the plurality of assembly components from the component carousel and assemble the unloaded assembly components.

2. The assembly apparatus of claim 1 wherein the component carousel supports a plurality of stacks of the plurality of assembly components at spaced locations arranged about a center point and further comprising:
   a motor coupled to the carousel base to rotationally position the plurality of stacks of assembly components for assembly.

3. The assembly apparatus of claim 2 further comprising an indexer coupled to the carousel base to align individual components from the plurality of stacks of the plurality of assembly components relative to the assembly arm.

4. The assembly apparatus of claim 1 wherein the carousel coupling device comprises a vacuum source operably coupled to the rotatable carousel base to supply vacuum pressure in an engaged mode to secure the component carousel to the carousel base and to release the vacuum pressure to remove the component carousel.

5. The assembly apparatus of claim 1 and further comprising the component carousel including a plurality of elongated component containers configured to contain the plurality of assembly components removably coupleable to the component carousel and positionable at spaced locations about a rotation axis of the carousel base.

6. The assembly apparatus of claim 1 wherein the apparatus includes a plurality of carousel bases rotationally coupled to the frame and a plurality of carousel coupling devices to removably support multiple component carousels relative to the plurality of carousel bases and the driver moves the assembly arm between the plurality of carousel bases to unload the multiple component carousels on the plurality of carousel bases.

7. The assembly apparatus of claim 6 wherein the apparatus includes a detector to detect when the multiple component carousels are empty and the assembly arm is coupled to a controller which is configured to shift operation of the assembly arm from one of the multiple component carousels to another of the multiple component carousels supported on the plurality of carousel bases based upon feedback from the detector.

8. The assembly apparatus of claim 1 and further comprising the component carousel and the component carousel containing discs for assembly in a spindle motor of a data storage device.

9. The assembly apparatus of claim 8 wherein the component carousel containing the discs includes a plurality of spaced latch assemblies about a circumference of the component carousel containing the discs to removably connect a plurality of disc containers storing a plurality of stacked discs to the component carousel at concentric spaced locations.

10. The assembly apparatus of claim 9 wherein the plurality of disc containers include covers and the apparatus includes a cover detacher to detach the disc container covers prior to assembling the discs from the plurality of disc containers.

11. The assembly apparatus of claim 1 and comprising the component carousel and the component carousel containing spacers for assembly in a spindle motor of a data storage device.

12. The assembly apparatus of claim 1 wherein the apparatus is adapted to assembly components of a disc stack of a spindle motor and further comprising:
   a plurality of carousel bases including a carousel base adapted to support a component carousel for discs and a carousel base adapted to support a component carousel for spacers;
   a plurality of assembly arms including an assembly arm coupled to the carousel base adapted to support the component carousel for the discs to assemble the discs and an assembly arm coupled to the carousel base adapted to support the component carousel for the spacers to assemble the spacers;
   a plurality of drivers coupled to the plurality of assembly arms to move the plurality of assembly arms between the plurality of carousel bases and a loading station; and
   a controller coupled to the plurality of drivers to coordinate operation of the plurality of assembly arms to alternately assemble the discs and the spacers.

13. The assembly apparatus of claim 12 and comprising the component carousel for the discs and the component carousel for the discs including a plurality of circumferentially spaced latch assemblies to removably couple a plurality of disc containers to the component carousel for the discs.

14. The assembly apparatus of claim 13 wherein the disc containers house a stack of coaxially aligned unassembled discs and the assembly apparatus further comprises an indexer to incrementally position the carousel base adapted to support the component carousel for the discs to sequentially unload individual discs in the stack of unassembled discs.

15. The assembly apparatus of claim 12 and comprising the component carousel for spacers including a plurality of spacer posts arranged about a center point and sized to support a plurality of stacked spacers and including a motor coupled to the carousel base to move the component carousel for spacers to align the plurality of stacked spacers for assembly.

16. The assembly apparatus of claim 15 further comprising an index rod operably coupled to the component carousel for spacers to push the spacers towards an extended end of the plurality of spacer posts for assembly.

17. An assembly apparatus comprising:
   an assembly arm and assembly arm driver operably coupled to the arm to operate the assembly arm to unload components from the assembly apparatus and load components in an unassembled device; and
   means for intermittently stocking the assembly apparatus with a supply of the components for assembly by the assembly arm.

18. An assembly apparatus comprising:
   a frame;
   a plurality of carousel bases rotationally coupled to the frame and rotatable about spaced rotation axes;
   an assembly arm movably coupled to the frame;
   an assembly arm driver coupled to the assembly arm to operate the assembly arm to unload components from carousels coupled to the plurality carousel bases; and
   controller operably coupled to the assembly arm and configured to sequentially operate the assembly arm between the plurality of carousel bases.

19. The assembly apparatus of claim 18 wherein the plurality of carousel bases support disc carousels and further comprising a plurality of disc unloaders coupled to the plurality of carousel bases and the plurality of carousel bases including an elevator coupled to the plurality of carousel bases to position sequential staked discs on the disc carousels relative to the plurality of disc unloaders.

20. The assembly apparatus of claim 18 including a plurality of disc carousels removably coupled to the plurality of carousel bases and the plurality of disc carousels removably supporting a plurality of disc containers including a plurality of stacked discs.

21. The assembly apparatus of claim 20 wherein the plurality of disc containers are removably supported by a plurality of latch assemblies.

22. An assembly apparatus comprising:
   a frame;
   a carousel base rotationally coupled to the frame;
   a carousel coupling device to removably couple a component carousel including a plurality of assembly components to the carousel base; and
   an assembly arm movably coupled to the frame to unload the plurality of assembly components from the component carousel removably coupled to the base.

23. The assembly apparatus of claim 22 and further comprising:
   a component carousel including a plurality of latching assemblies to removably couple a plurality of component containers thereto.

* * * * *